(12) United States Patent
Dhulipudi et al.

(10) Patent No.: US 9,389,082 B2
(45) Date of Patent: Jul. 12, 2016

(54) SYSTEM AND METHOD FOR AUTOMATIC GENERATION OF AERODROME SURFACE MOVEMENT MODELS

(71) Applicant: HONEYWELL INTERNATIONAL INC., Morristown, NJ (US)

(72) Inventors: Durga Prasad Dhulipudi, Andhra Pradesh (IN); Narendra Ojha, Andhra Pradesh (IN); Govind Dakoju, Andhra Pradesh (IN); Sreedhar Garbham, Andhra Pradesh (IN); Amit Srivastav, Karnataka (IN); Don Nicholas, Phoenix, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 46 days.

(21) Appl. No.: 14/224,420

(22) Filed: Mar. 25, 2014

(65) Prior Publication Data
US 2015/0276409 A1 Oct. 1, 2015

(51) Int. Cl.
*G08G 5/06* (2006.01)
*G01C 21/00* (2006.01)

(52) U.S. Cl.
CPC ................ *G01C 21/00* (2013.01); *G08G 5/065* (2013.01)

(58) Field of Classification Search
CPC ...................................................... G01C 21/00
See application file for complete search history.

(56) References Cited

U.S. PATENT DOCUMENTS

| 7,567,187 B2 | 7/2009 | Ramaiah et al. |
| 8,581,909 B2 | 11/2013 | Biarnes et al. |
| 2011/0125400 A1 | 5/2011 | Michel et al. |

FOREIGN PATENT DOCUMENTS

EP 2660676 A1 11/2013

OTHER PUBLICATIONS

Hak-Tae Lee, et al.; Automating the Process of Terminal Area Node—Link Model Generation, AIAA Modeling and Simulation Technologies Conference and Exhibit, Aug. 18-21, 2008, Honolulu, HI, AIAA 2008-7101, AF2008102; Copyright 2008 by the American Institute of Aeronautics and Astronautics, Inc.
Gano B. Chatterji, et al.; Wheels-Off Time Estimation at Non-ASDE-X Equipped Airports, 2013 Aviation Technology, Integration, and Operations Conference, Aug. 12-14, 2013, Los Angeles, CA, AIAA 2013-4274; Copyright 2013 by the American Institute of Aeronautics and Astronautics, Inc.
Extended EP Search Report for Application No. 15158320.0-1958/2927894 dated Aug. 3, 2016.

*Primary Examiner* — Todd Melton
(74) *Attorney, Agent, or Firm* — Ingrassia, Fisher & Lorenz, P.C.

(57) ABSTRACT

A method and system are provided to generate aerodrome surface area node-link graphs. The terminal area network generator provided constructs terminal area networks from reliable terminal area node-links that do not require further manual processing. The exemplary embodiment is compatible with the AIRAC cycle.

18 Claims, 14 Drawing Sheets

SYSTEM AND METHOD FOR AUTOMATIC GENERATION OF AERODROME SURFACE MOVEMENT MODELS

TECHNICAL FIELD

Embodiments of the subject matter described herein relate generally to aerodrome surface guidance and navigation, and, more particularly, to the generation of aerodrome surface movement models.

BACKGROUND

Accurate and efficient modeling of aerodrome surface movement is an essential part of air transportation simulation. As air traffic increases, the aircraft ground transportation (herein referred to as aerodrome surface movement) and the density of aircraft travel paths in aerodrome surfaces also increase. Many aerodrome surface maps have been digitized and categorized in geographic information systems (GIS) models according to aeronautical database standards such as D0-272 (established by the Radio Technical Commission for Aeronautics). The digitized aerodrome surface maps are very complex, and too cumbersome for quick modeling of aerodrome surface movement or for quick data transmission to aircraft. Therefore, in order to support aircraft surface guidance and navigation, models must be simplified representations of the aerodrome surface movement, and the model generator must reliably extract the essential information from the digitized aerodrome surface map.

"Terminal area networks" are aerodrome surface movement models that provide simplified representations of aerodrome surface movement. As such, terminal area networks support aircraft surface guidance and navigation with the creation of unambiguous aircraft travel paths, the display of aircraft travel paths on an aerodrome surface map, and the transmission of aircraft travel paths in a format usable by onboard applications. The terminal area network is a graphic map that includes a series of terminal node-links combined into a terminal node-link graph.

As the building block of the terminal area network, the terminal area node-link is the most important component of aircraft situational awareness, surface guidance, and navigation. The terminal area node-link represents a travel path within the terminal area network; a travel path may be a taxiway or a runway. The terminal area node-link forms the core of visual and aural warnings generated in aerodrome moving map displays in cockpits. Accurate terminal area node-link information is the precondition for accurate and reliable spatial data within the terminal area network.

Terminal area networks are based upon maps generated by mapping agencies that extract information from aerial or satellite imageries, portions of scanned paper maps, or a combination thereof. Currently, terminal area node-links are manually or semi-automatically generated; the terminal node-links are combined into terminal node-link graphs; terminal node-link graphs are incorporated into terminal area networks. Manual review or manual further processing is inefficient and often results in including some errors that are hard to detect and fix. Naturally, any errors in the node-links are propagated into the terminal area network. Additionally, reliance on manual steps has prevented producing terminal area node-links in accordance with the Aeronautical Information Regulation and Control (AIRAC) cycle, which is an automatic data generation cycle every 28 days.

Thus, a system and method is desirable that can generate terminal area networks without further manual processing. The desired method constructs terminal area networks from accurate and terminal area node-links that do not require further manual processing. The desirable method may be operated in accordance with the AIRAC cycle.

BRIEF SUMMARY

A method is provided suitable for generation of a surface movement network. A travel path and the directionality of the travel path are received from an aerodrome mapping database. Travel paths that are taxiways are represented by a set of polygons. A centerline that is consistent with the directionality of the travel path is created for each polygon. The taxiway centerline is generated using the polygon centerlines.

A system is provided for generation of a surface movement network. The system includes a processor coupled to a database. The database obtains travel path data from an Aerodrome mapping database. The processor is configured to (a) obtain a travel path, (b) obtain directionality of the travel path, (c) represent a taxiway by a set of polygons, (d) create centerlines of the taxiway polygons using directionality and (e) generate a taxiway centerline using the polygon centerlines.

Also included is another method for generation of a surface movement network. The method includes obtaining travel path data from an aerodrome mapping database and then sorting the travel path data into runway data or taxiway data. Runway threshold points for a runway are obtained, and a centerline of the runway is created consistent with the runway threshold points. Next, each taxiway is represented by a set of polygons. The polygons are categorized according to the number of shared edges using intersections between travel paths. Centerlines are generated for the polygons and taxiway centerlines are generated using the polygon centerlines.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived from the following detailed description taken in conjunction with the accompanying drawings, wherein, like reference numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the following Detailed Description.

Figure 1:
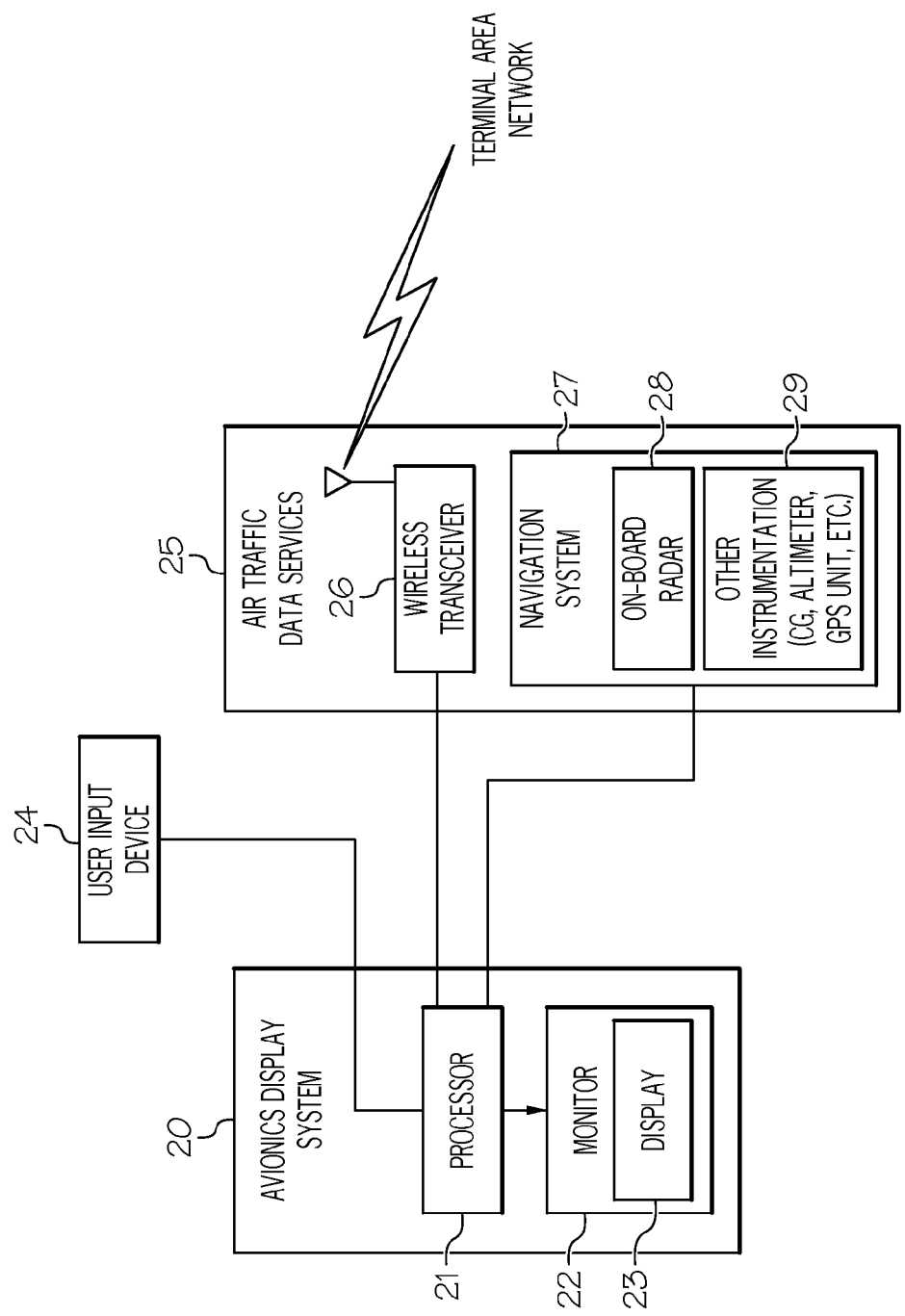
FIG. 1 is a functional block diagram illustrating an avionics display system in accordance with an exemplary embodiment.

FIG. 1 is a functional block diagram illustrating an avionics display system 20 in accordance with an exemplary embodiment. Avionics display system 20 includes at least a first processor 21, at least one monitor 22 and a user input device 24, each of which is operatively coupled to the first processor 21. During operation of avionics display system 20, first processor 21 is coupled to monitor 22 to produce a display 23 that visually provides a pilot and crew with a graphic display of a terminal area network. The first processor 21 may provide the display 23 with a composite image in a two dimensional format (e.g., as a moving map display), or in a hybrid format (e.g., in a picture-in-picture or split screen arrangement).

The first processor 21 may comprise, or be associated with, any suitable number of individual microprocessors, flight control computers, navigational equipment, memories, power supplies, storage devices, interface cards, and other standard components known in the art. In this respect, the first processor 21 may include or cooperate with any number of software programs (e.g., avionics display programs) or instructions designed to carry out the various methods, process tasks, calculations, and control/display functions described below. The first processor 21 may be included within a Flight Management Computer of the type commonly deployed within a Flight Management System (FMS).

Image-generating devices suitable for use as monitor 22 include various analog (e.g., cathode ray tube) and digital (e.g., liquid crystal, active matrix, plasma, etc.) display devices. In certain embodiments, monitor 22 may assume the form of a Head-Down Display (HDD) or a Head-Up Display (HUD) included within an aircraft's Electronic Flight Instrument System (EFIS). Monitor 22 may be disposed at various locations throughout the cockpit. For example, monitor 22 may comprise a primary flight display (PFD) and reside at a central location within the pilot's primary field-of-view. Alternately, monitor 22 may comprise a secondary flight deck display, such as an Engine Instrument and Crew Advisory System (EICAS) display, mounted at a location for convenient observation by the aircraft crew but that generally resides outside of the pilot's primary field-of-view.

The first processor 21 includes one or more inputs operatively coupled to one or more air traffic data services 25. During operation of avionics display system 20, the air traffic data services 25 continually provide first processor 21 with navigational data. In the exemplary embodiment illustrated in FIG. 1, the air traffic data sources include a wireless transceiver 26 and a navigation system 27, which are operatively coupled to first and second inputs of first processor 21, respectively. Navigation system 27 includes onboard radar 28 and other onboard instrumentation 29, such as a radio altimeter, a barometric altimeter, a global positioning system (GPS) unit, and the like. Navigation system 27 may be included within a FMS, and onboard radar 28 may be included within a Terrain Awareness and Warning System (TAWS), such as an Enhanced Ground Proximity Warning System (EGPWS).

With continued reference to FIG. 1, wireless transceiver 26 is considered an air traffic data source in that wireless transceiver 26 receives navigational data from external control sources and relays this data to first processor 21. For example, wireless transceiver 26 may receive terminal area network data from one or more ground-based facilities, as well as information from Flight Service Stations, control towers, and the like.

Figure 2:
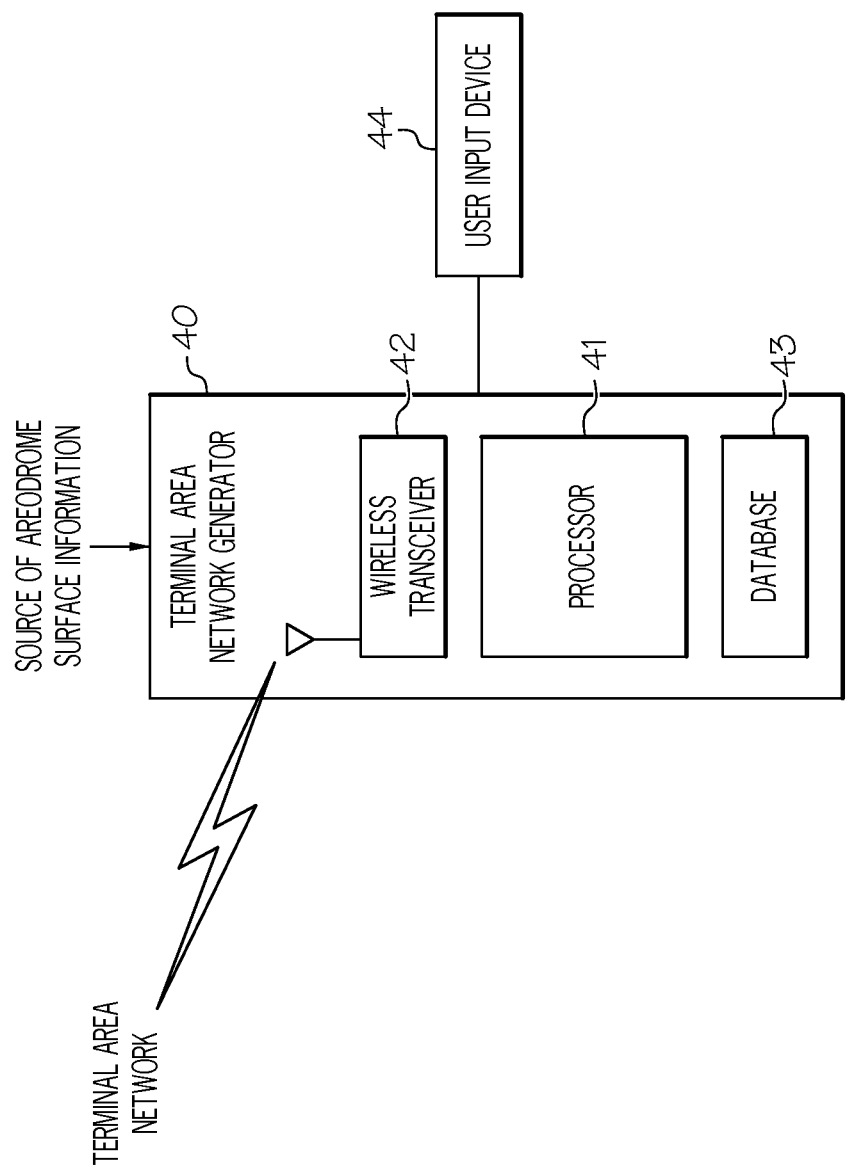
FIG. 2 is a functional block diagram illustrating a terminal area network generator in accordance with an exemplary embodiment.

FIG. 2 is a functional block diagram illustrating a terminal area network generator 40 in accordance with an exemplary embodiment. Terminal area network generator 40 includes a second processor 41, a second wireless transceiver 42 and a database 43. A user input device 44 and a source of aerodrome map data is included. Terminal area networks are transmitted wirelessly and received by an aircraft prior to flight. In this exemplary embodiment, a wireless transceiver (for example, wireless transceiver 26 of FIG. 1) receives terminal area network data from terminal area network generator 40 and relays this data to a processor in the avionics display system (for example, first processor 21 of FIG. 1).

Terminal area network generator 40 receives aerodrome surface information, map data ("data"), in a GIS aerodrome mapping database standard such as DO-272/DO-291, AIXM or ARINC 816. Each of the aforementioned standards provides shape files. A shape file is a popular geospatial vector data format for geographic information system software. The shape files utilized herein generally adhere to Environmental Systems Research Institute (ESRI) standards of interoperability, and provide vector features, points, lines, polygons, and the like. The shape files therefore provide aerodrome features such as runways, runway threshold points, taxiways, intersections, aprons, frequency areas, signage, and taxiway identifiers. The terminal area network generator 40 converts data from latitude/longitude to Universal Transverse Mercator (UTM) before geoprocessing the data. Data conversion, geoprocessing and associated data manipulation and management are performed by the second processor 41, utilizing the database 43. Geoprocessing is a geographic information system operation used to manipulate spatial data. A typical geoprocessing operation takes an input dataset, performs an operation on that dataset, and returns the result of the operation as an output dataset. Common geoprocessing operations include geographic feature overlay, feature selection and analysis, topology processing, raster processing, and data conversion. Creation of the terminal area networks is a geoprocessing activity that takes place in the second 41 in coordination with the database 43.

The terminal area network generator 40 creates terminal area node links in several steps. First, a travel path and the direction of intended travel along the travel path (directionality) are obtained. For travel paths that are taxiways, the taxiway is divided into polygons. Polygon centerlines are created using the directionality of the parent taxiway, and then the entire parent taxiway centerline is created by coupling the centerlines of the individual child polygons. Runways are identified and managed differently. Runway threshold points are obtained and used to create each runway centerline. The aerodrome surface movement is completely mapped when all individual terminal area node links are coupled together using directionality, resulting in a terminal area network. FIGS. 3-15 and the accompanied detailed descriptions describe the generation of individual terminal area node links according to an exemplary embodiment.

As described hereinabove, the terminal area network generator 40 is a land-based system and method that generates terminal area networks every 28 days, in accordance with the Aeronautical Information Regulation and Control (AIRAC) cycle. Terminal area networks may be stored in the database 43. An aircraft accesses the terminal area network data via the wireless transceiver 42, generally uploading all relevant terminal area networks prior to a flight. However, terminal area network data may be accessed from the terminal area network generator 40 at any time.

The user input device 44, allows for ground-based input control in addition to the control provided by the wireless transceiver 42. Various data are input into the terminal area network generator 40 via the user input device 44, for example parameters and controls utilized in the generation of polygon centerlines, as discussed hereinbelow.

Figure 3:
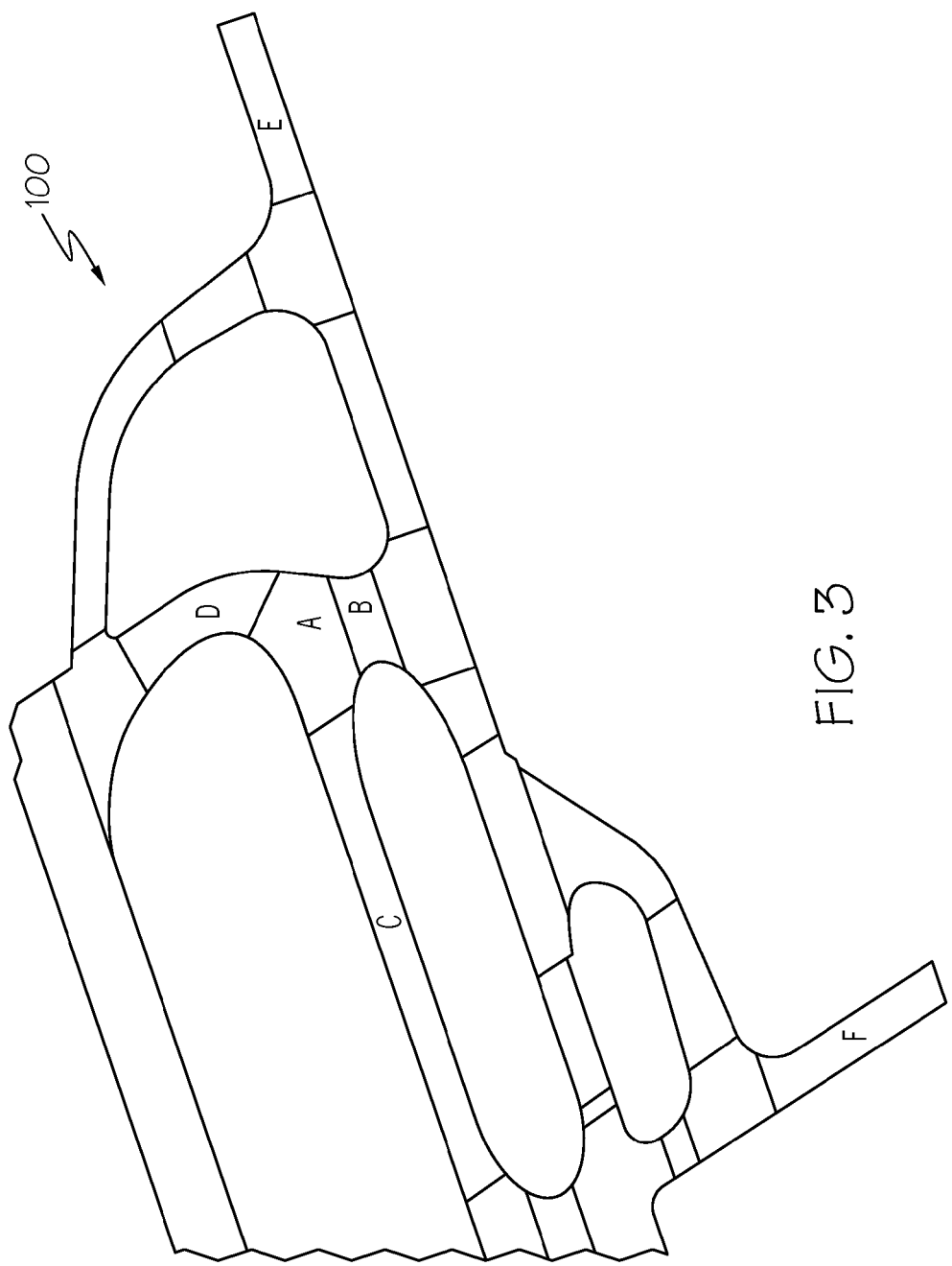
FIG. 3 is a diagram showing exemplary geometry of aerodrome surface features.

FIG. 3 is a diagram showing exemplary geometry of aerodrome surface features. Several travel paths are shown, with associated intersections. In the exemplary embodiment, travel path information is retrieved from a geographic information system (GIS) such as the Aerodrome Mapping Database (AMDB). Travel paths include taxiways and runways. The taxiways are divided into polygons. FIG. 3 shows a taxiway divided into polygons according to the exemplary embodiment. Polygon A shares edges with Polygon B, polygon C and polygon D. Each shared edge of a polygon functions an entry/exit for travel, and is therefore representative of directionality. Single entry/exit polygons have exactly one shared edge, such as polygon E and polygon F.

Polygons having exactly two shared edges are called connector polygons. In the exemplary diagram, Polygon B, polygon D and polygon C are each connector polygons. A polygon that has more than two shared edges is termed a convergent polygon. In the exemplary diagram, Polygon A is a convergent polygon.

As an overview of the following detailed description, the exemplary embodiment generates centerlines, or links, for each of the taxiways using the centerlines of each of the polygons making up a taxiway. The exemplary embodiment generates centerlines, or links, for runways differently. Runways are travel paths with unique identifiers in the Aerodrome Mapping Database. Each runway has painted centerline features which are a connection of two extreme centerline points of the given runway. The extreme centerline points on a runway are termed as Runway Threshold points. Runway Threshold points are included in the aerodrome surface information stored in the Aerodrome Mapping Database. The terminal area network generator 40 first completes the generation of the individual links (referred to herein as node-links) for the complete aerodrome surface map. The node-links are then used in the generation of the terminal node-link graph. FIGS. 4-10 illustrate the generation of various terminal node links, and FIGS. 11-14 illustrate coupling various node-links together, forming nodes in the eventual terminal node-link graph.

Figure 4:
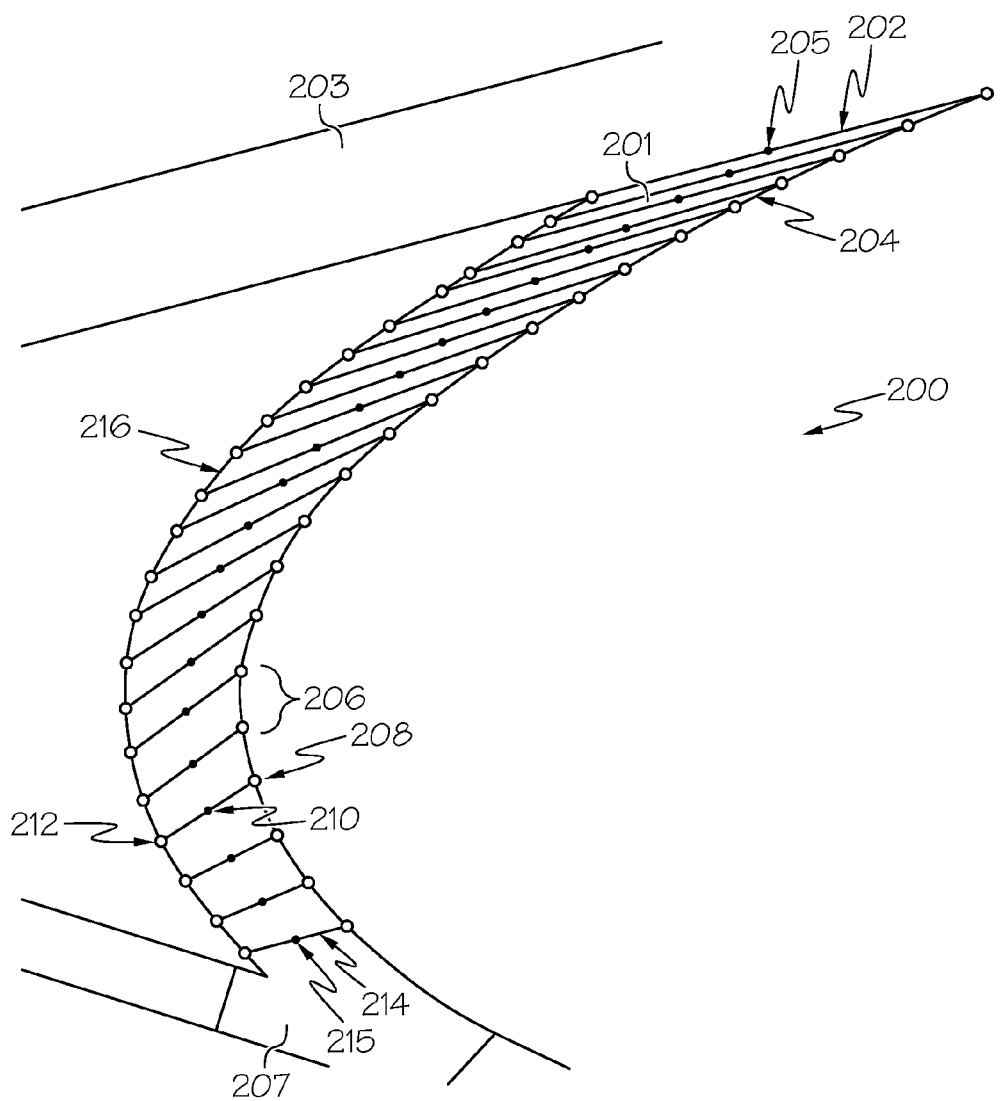
FIG. 4 is an illustration showing the generation of a centerline for a polygon having exactly two shared edges, according to an exemplary embodiment.

FIG. 4 is an illustration showing the generation of a centerline for a polygon with exactly two shared edges, according to an exemplary embodiment, and shows aerodrome surface features 200, connector polygon 201, having a first shared edge 202 and a second shared edge 214. First shared edge 202 is shared between polygon 203 and connector polygon 201. Second shared edge 214 is shared between connector polygon 201 and polygon 207.

Connector polygon 201 has a first unshared edge 204 and a second unshared edge 216. Centerlines, or links, are created as follows. A predetermined parameter 206 is obtained from a user input device (for example, user input device 44 of FIG. 2). The longer unshared edge (first unshared edge 204) is divided by predetermined parameter 206, creating N equal sized segments. The shorter unshared edge (second unshared edge 216) is then divided into N equal segments, and segment endpoints on the longer unshared edge are sequentially paired up with segment endpoints from the shorter unshared edge. For example, a first segment endpoint 208 on the first unshared edge 204 is paired with a second segment endpoint 212 on the second unshared edge 216. At completion of the pairing process, the connector polygon 201 appears to have a ladder overlaid on it, as shown in FIG. 4. The rungs of the ladder being the series of sequentially paired endpoints.

Midpoints of the paired endpoints are determined, for example, midpoint 210 has been determined between a first segment endpoint 208 and a second segment endpoint 212. Next, the midpoints of the paired endpoints are connected to each other. Finally, midpoints for the shared edges are determined. As shown, the first shared edge, 202, has midpoint 205 and the second shared edge 214, has midpoint 215. The centerline, or link, for this travel path is generated when the midpoints from the pairs are connected to the midpoints of the shared edges.

Figure 5:
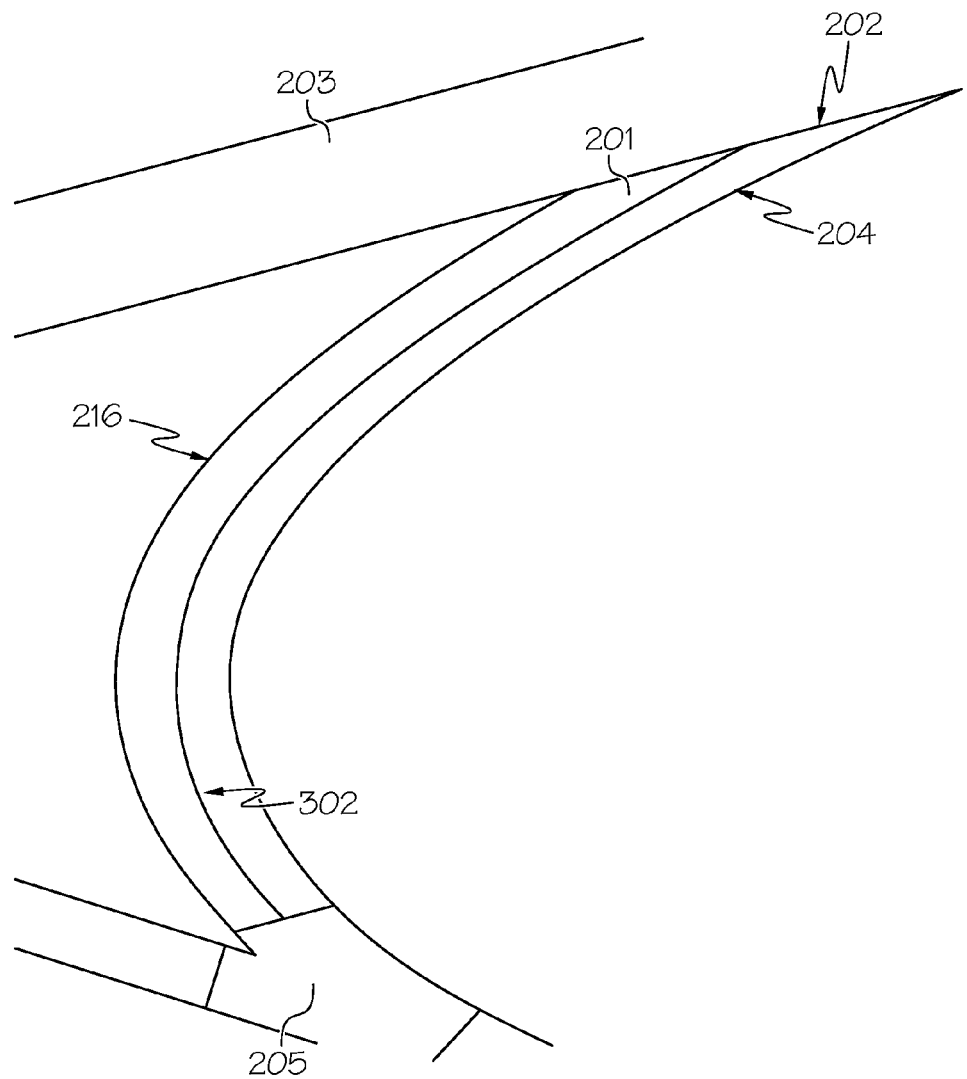
FIG. 5 is an illustration showing the centerline generated according to the exemplary embodiment shown in FIG. 4.

FIG. 5 is an illustration showing the centerline generated according to the exemplary embodiment shown in FIG. 4. Aerodrome surface features 300 are shown, and include connector polygon 201, bound by a first shared edge 202 and a second shared edge 214. Connector polygon 201 has a first unshared edge 204 and a second unshared edge 216. Polygon 203 is adjacent to connector polygon 201, sharing first shared edge 202. Polygon 207 shares second shared edge 214 with connector polygon 201. Centerline 302 is shown, which is the result of connecting the midpoints of the paired endpoints as described above.

Figure 6:
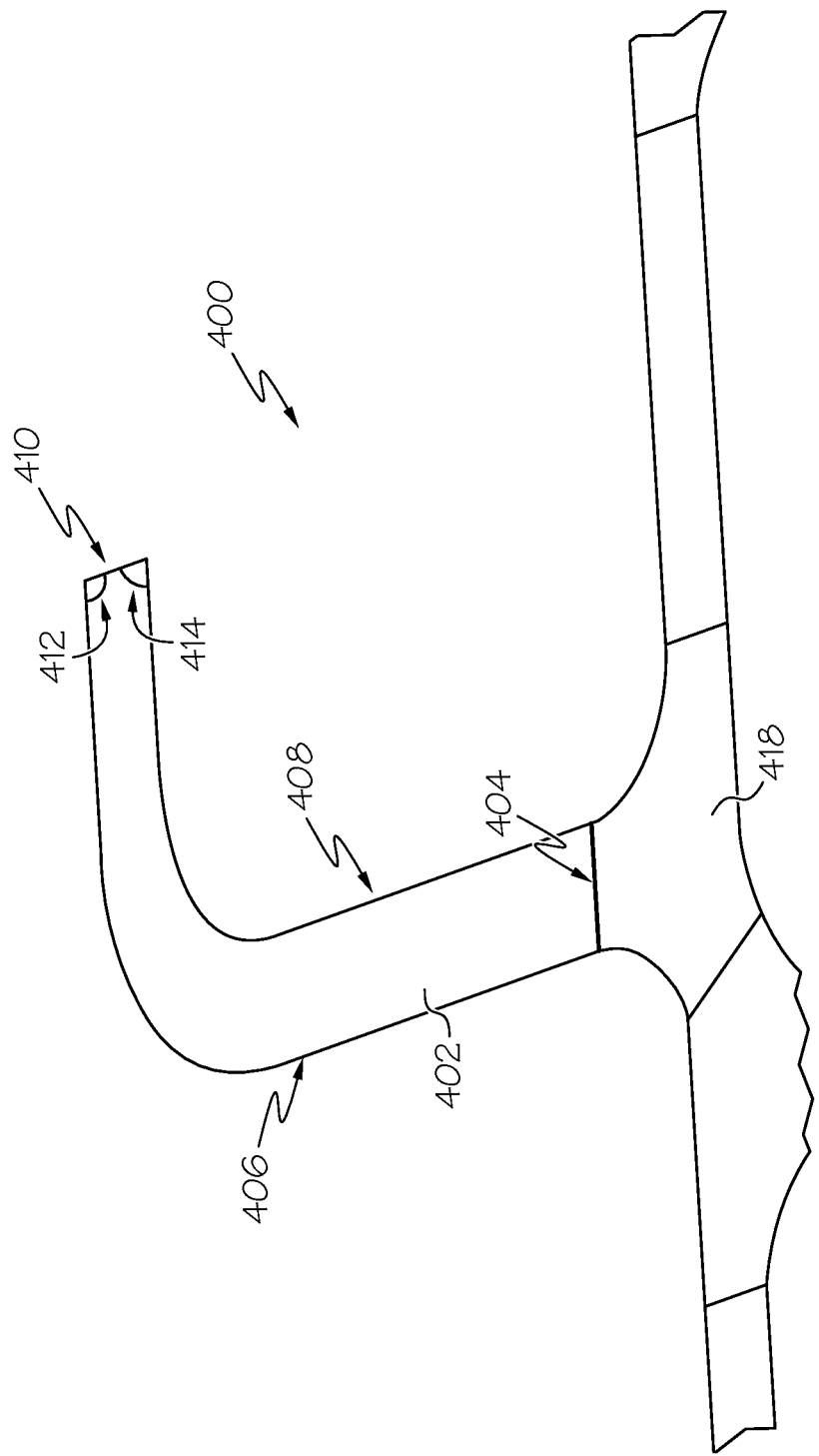
FIG. 6 is an illustration showing the generation of a centerline of a polygon having exactly one shared edge, according to an exemplary embodiment.

FIG. 6 is an illustration showing the generation of a centerline of a polygon with exactly one shared edge, according to an exemplary embodiment. Aerodrome surface features 400 are shown, and include polygon 402, with shared edge 404, unshared edge 406 and unshared edge 408. Polygon 402 shares shared edge 404 with polygon 418. The terminal area network generator 40 identifies the pseudo shared edge of a polygon with exactly one shared edge as follows. Consecutive internal angles within the polygon are analyzed. A first internal angle, PHI 1, and a consecutive second internal angle, PHI 2, are selected such that the sum of PHI 1 (412) and PHI 2 (414) is 180 degrees or less. The vertex at PHI 1 is connected to the vertex at PHI 2, creating pseudo-shared edge 410.

Figure 7:
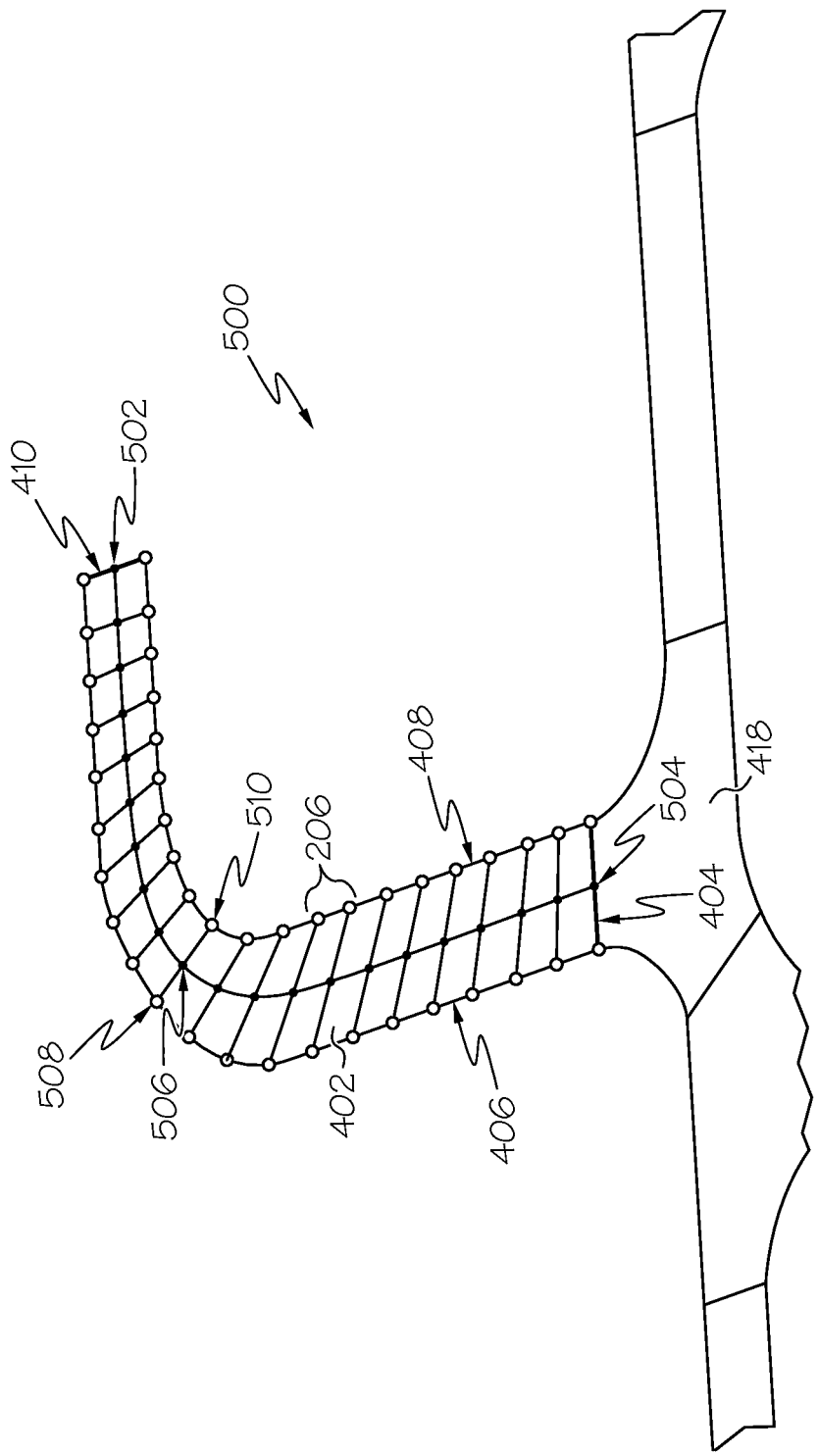
FIG. 7 is an illustration showing the centerline generated according to the exemplary embodiment shown in FIG. 6.

FIG. 7 is an illustration showing the centerline generated according to the exemplary embodiment shown in FIG. 6. Aerodrome surface features 500 are shown, and include polygon 402, with shared edge 404, unshared edge 406 and unshared edge 408. Polygon 402 shares shared edge 404 with polygon 418. A pseudo-shared edge midpoint 502 is determined for the pseudo-shared edge 410. The shared edge midpoint 504 is determined for shared edge 404.

The centerline, or link, is created as described in FIG. 4 as follows. The predetermined parameter 206 is a unit of length obtained from a user input. The longer unshared edge 406 is divided by predetermined parameter 206, creating N equal sized segments. The shorter unshared side 408 is then divided into N equal segments, and segment endpoints on the longer unshared edge are sequentially paired up with segment endpoints from the shorter unshared edge. For example, a first segment endpoint 508 is paired with a second segment endpoint 510. At completion of the pairing process, the polygon 402 appears to have a ladder overlaid on it, as shown in FIG. 7. The rungs of the ladder being the series of sequentially paired endpoints.

Midpoints of the paired endpoints are determined, for example, midpoint 506 is half the distance between a first segment endpoint 508 and a second segment endpoint 510. Next, the midpoints of the paired endpoints are connected to each other. The centerline, or link, for this travel path is generated when the midpoints from the pairs are connected to the shared edge midpoint 504 and to the pseudo-shared edge midpoint 502.

Figure 8:
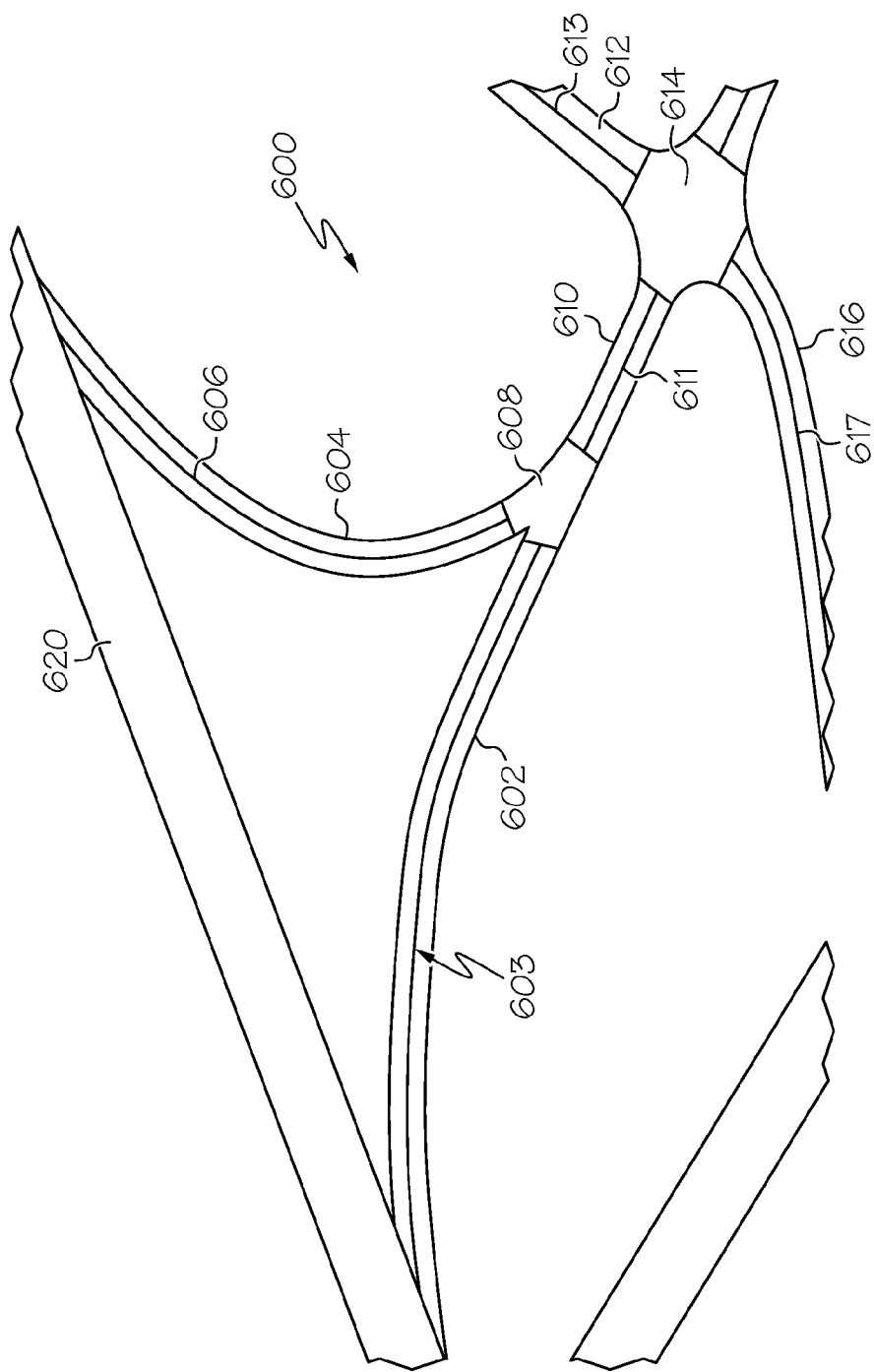
FIG. 8 is an illustration showing polygons having exactly one or exactly two shared edges, with centerlines generated according to the exemplary embodiment.

FIG. 8 is an illustration showing polygons having exactly one or exactly two shared edges with centerlines generated according to the exemplary embodiment. Aerodrome surface features 600 are shown, including connector polygon 602, with centerline 603. Connector polygon 604 with centerline 606 is shown. Connector polygon 610 with centerline 611 is shown adjacent to convergent polygon 608 and adjacent to convergent polygon 614. In the illustration of FIG. 6, polygon 616, with centerline 617, is shown with only one shared edge, and polygon 612, with centerline 613 is also shown. Polygon 620 is included to illustrate a runway travel path. The process for creating a centerline for a runway is described in FIG. 3 herein above.

Figure 9:
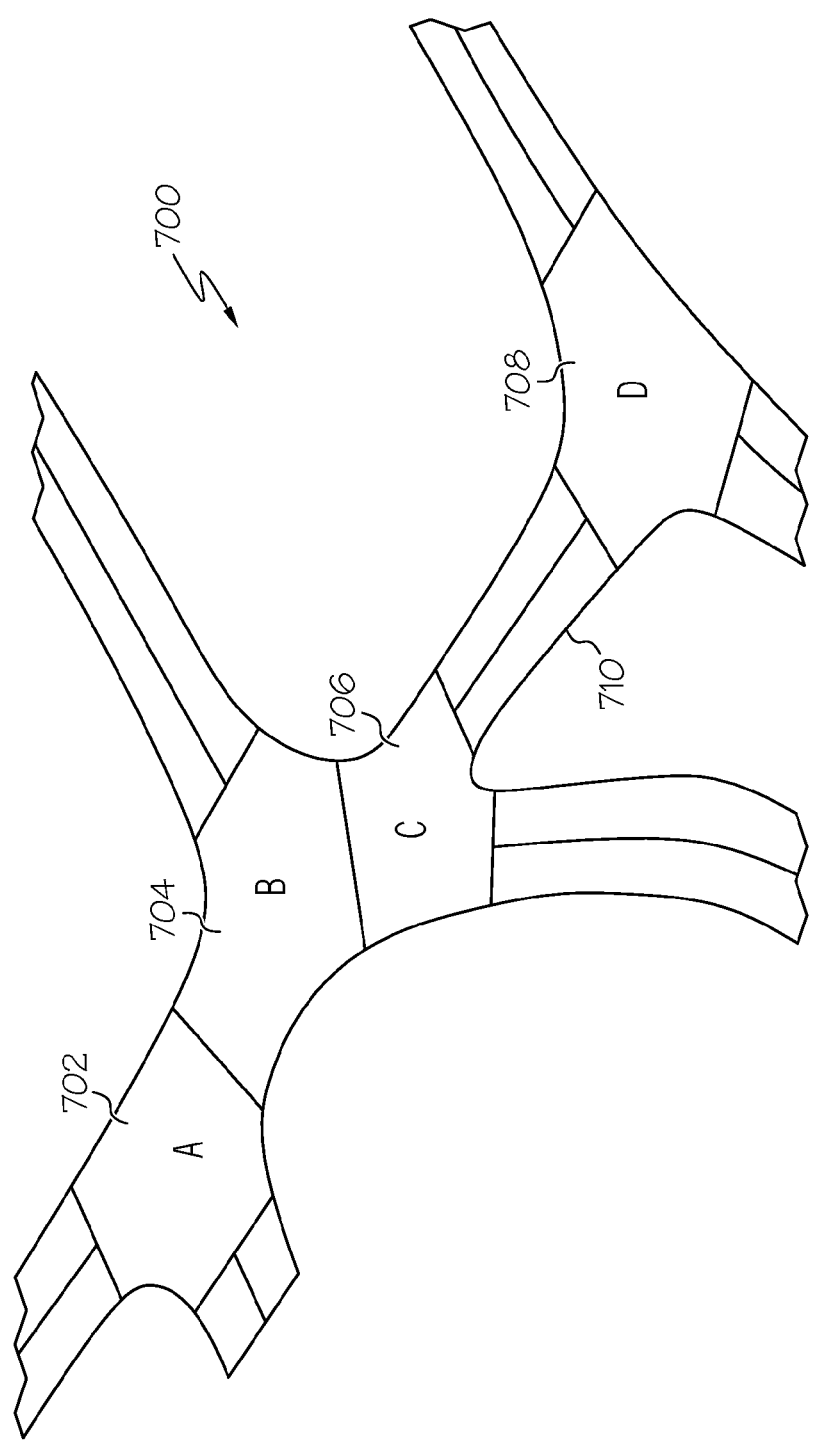
FIG. 9 is an illustration of aerodrome surface features having adjacent convergent polygons.

FIG. 9 is an illustration of adjacent convergent polygons, according to an exemplary embodiment. Aerodrome surface features 700 include convergent polygon A (702), convergent polygon B (704), convergent polygon C (706) and convergent polygon D (708). Connector polygon 710 is adjacent to convergent polygon C (706) and convergent polygon D (708). As shown, polygon A (702) is adjacent to polygon B (704), and polygon C (706) is also adjacent to polygon B (704). The exemplary embodiment analyzes convergent polygons for adjacency to other convergent polygons. When two convergent polygons are adjacent, they are merged via their shared edge, into a single aggregate convergent polygon (hereinafter referred to as aggregate polygon). This process of checking adjacency and merging polygons is repeated until there are no adjacent convergent polygons.

Figure 10:
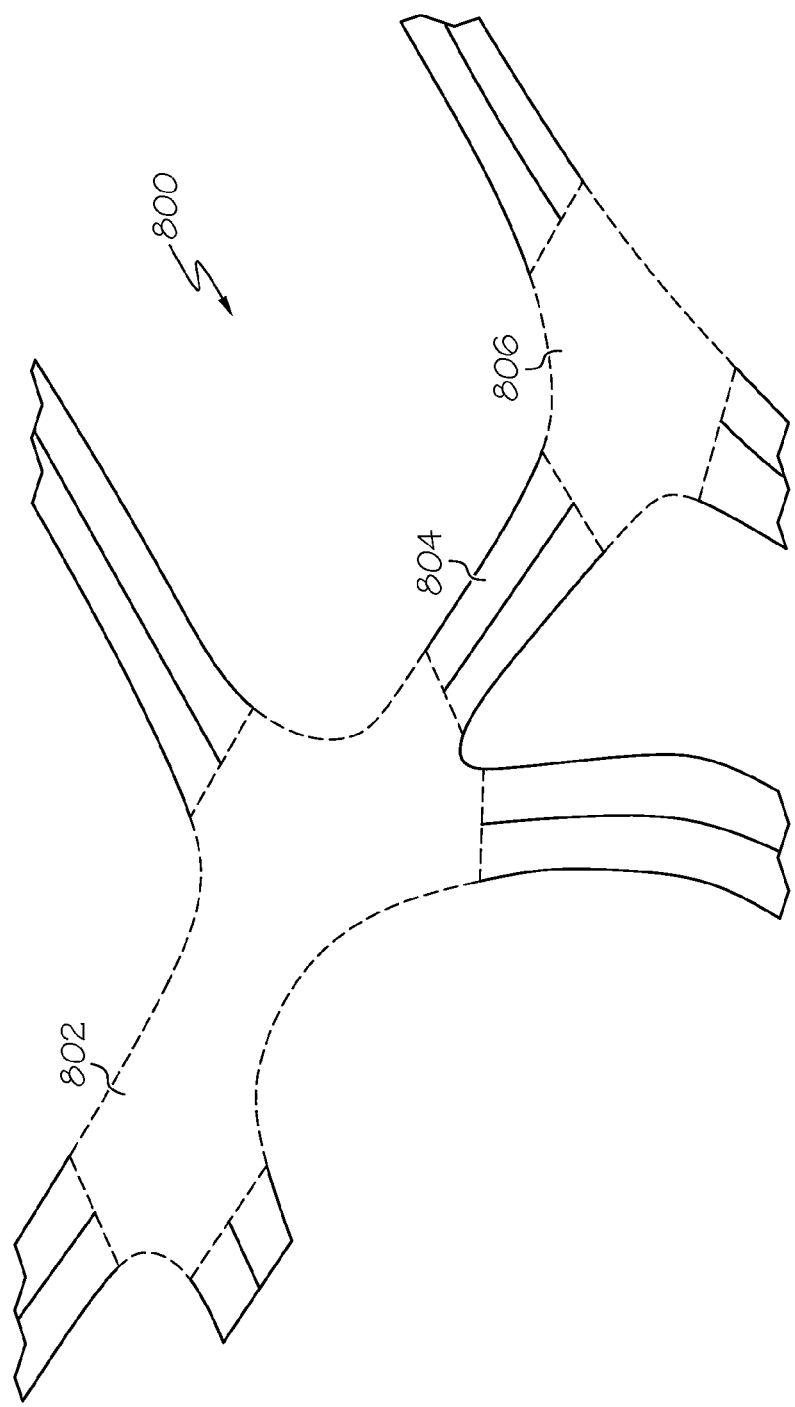
FIG. 10 is an illustration of the adjacent convergent polygons of FIG. 9 merged into an aggregate polygon, according to an exemplary embodiment.

FIG. 10 is an illustration of the adjacent convergent polygons of FIG. 9 merged into an aggregate polygon, according to an exemplary embodiment. Aerodrome surface features 800 include aggregate polygon 802, shown as the aggregated result of merged polygons A (702), polygon B (704) and polygon C (706) from FIG. 7. Also included is connector polygon 804 and convergent polygon 806.

When all of the terminal node links for individual polygons are generated, the terminal area network generator 40 couples the terminal node links, generating the complete terminal area network. FIGS. 11-14 and the associated detailed description describe this step according to an exemplary embodiment.

Figure 11:
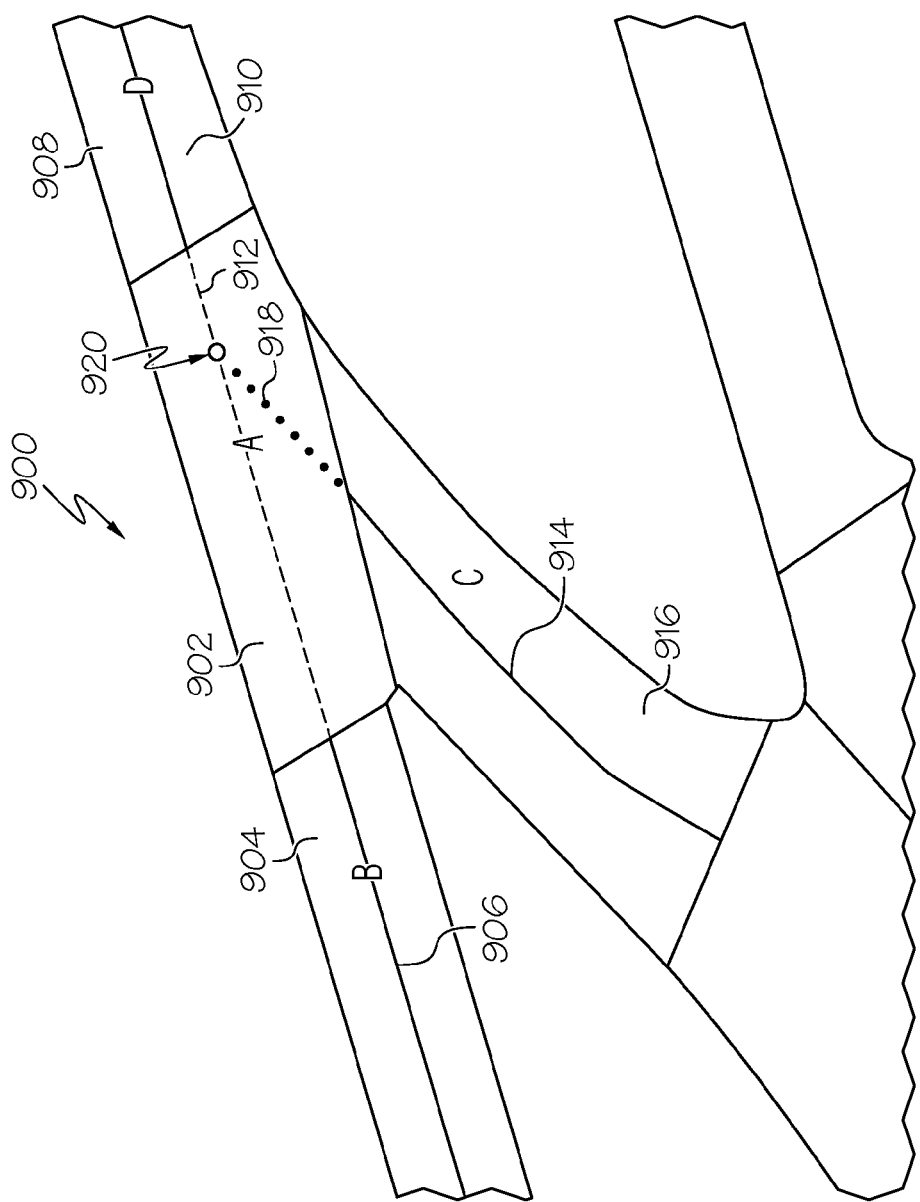
FIG. 11 is an illustration showing a method for coupling of centerlines within a convergent polygon according to an exemplary embodiment.

FIG. 11 is an illustration showing a method for coupling of centerlines within a convergent polygon, according to an exemplary embodiment. Aerodrome surface features 900 depict convergent polygon 902. Convergent polygon 902 shares an edge with polygon 904, shares an edge with polygon 908 and shares another edge with polygon 916.

The locations of centerlines of pairs of the adjacent polygons are analyzed to determine if any pair of adjacent polygons has centerlines that are substantially parallel. In the embodiment shown, centerline 906, of polygon 904, and centerline 910, of polygon 908, are determined to be substantially parallel. The exemplary embodiment couples the substantially parallel centerlines across the convergent polygon. Centerline 912, shown in long dashed lines, is shown as the result of coupling centerline 906 to centerline 910. Next, the exemplary embodiment extends the centerlines of all remaining polygons adjacent to the convergent polygon onto the centerline of the convergent polygon 902. As shown, centerline 914 is extended into the centerline 912 of convergent polygon 902 as a dotted line 918, connecting with centerline 912 at node 920.

Figure 12:
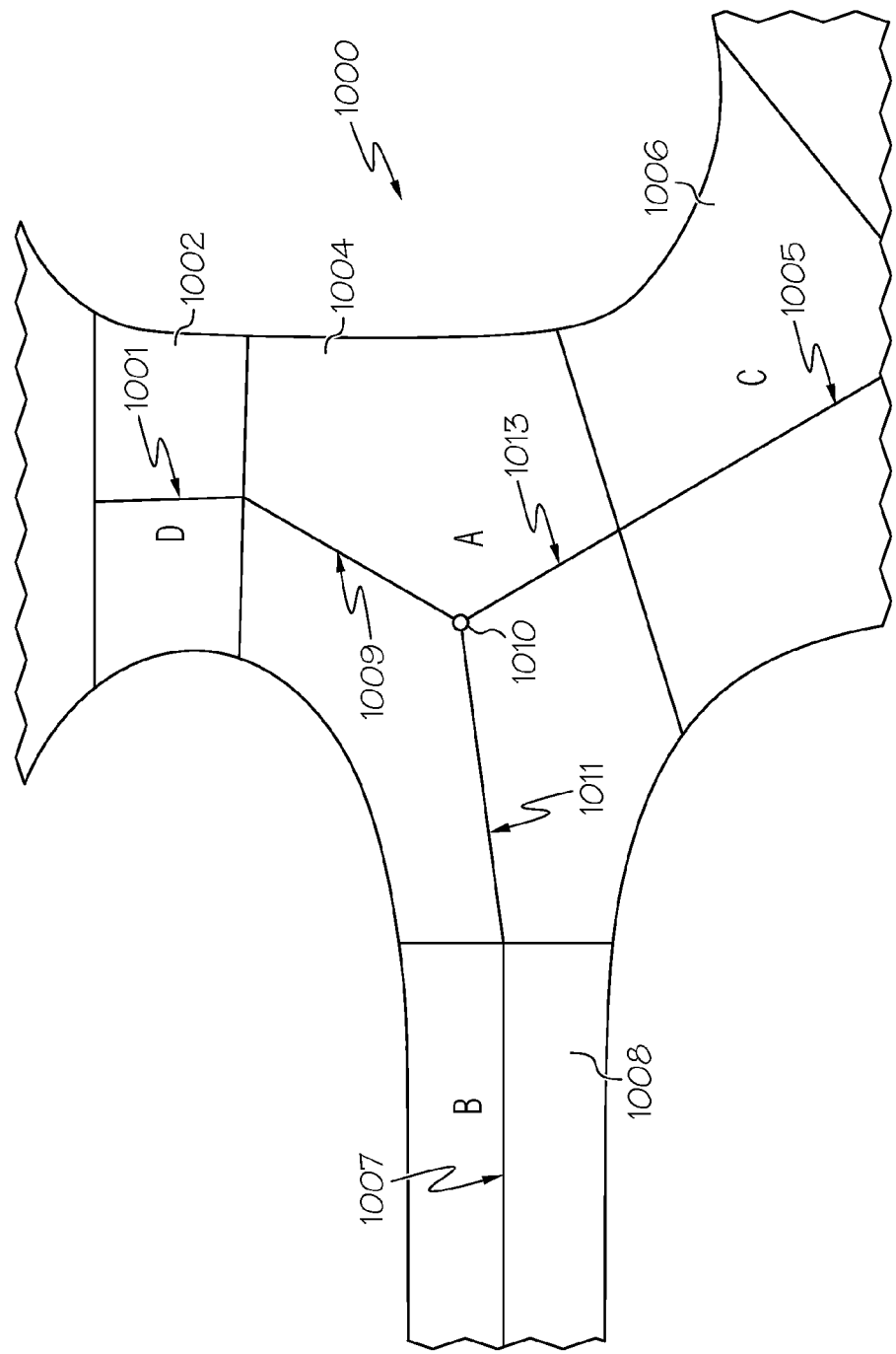
FIG. 12 is an illustration showing an alternate method for coupling of centerlines within a convergent polygon according to the exemplary embodiment.

If, after the locations of centerlines of pairs of the adjacent polygons are analyzed to determine if any pair of adjacent polygons has centerlines that are substantially parallel, it is determined that none of the centerlines of pairs of adjacent polygons are substantially parallel, the exemplary embodiment will extract the centroid of the convergent polygon, as described in FIG. 12.

FIG. 12 is an illustration showing an alternate method for coupling of centerlines within a convergent polygon, according to the exemplary embodiment. Aerodrome surface features 1000 depict convergent polygon 1004. Convergent polygon 1004 shares an edge with polygon 1002, shares an edge with polygon 1008 and shares another edge with polygon 1006.

After the locations of centerlines of pairs of the adjacent polygons are analyzed to determine if any pair of adjacent polygons has centerlines that are substantially parallel is performed, it is determined that centerline 1001 is not substantially parallel to centerline 1007 and is also not substantially parallel to centerline 1005. The centroid 1010 of convergent polygon 1004 is extracted. Next, the centerlines of the adjacent polygons are extended into the convergent polygon to connect at the centroid. As shown, centerline 1001 is extended as centerline 1009, connecting at centroid 1010. In this example, there is only one node within the convergent polygon, and that is centroid 1010. Centerline 1005 is extended as centerline 1013, connecting at centroid 1010, and centerline 1007 is extended as centerline 1011, connecting at centroid 1010.

Figure 13:
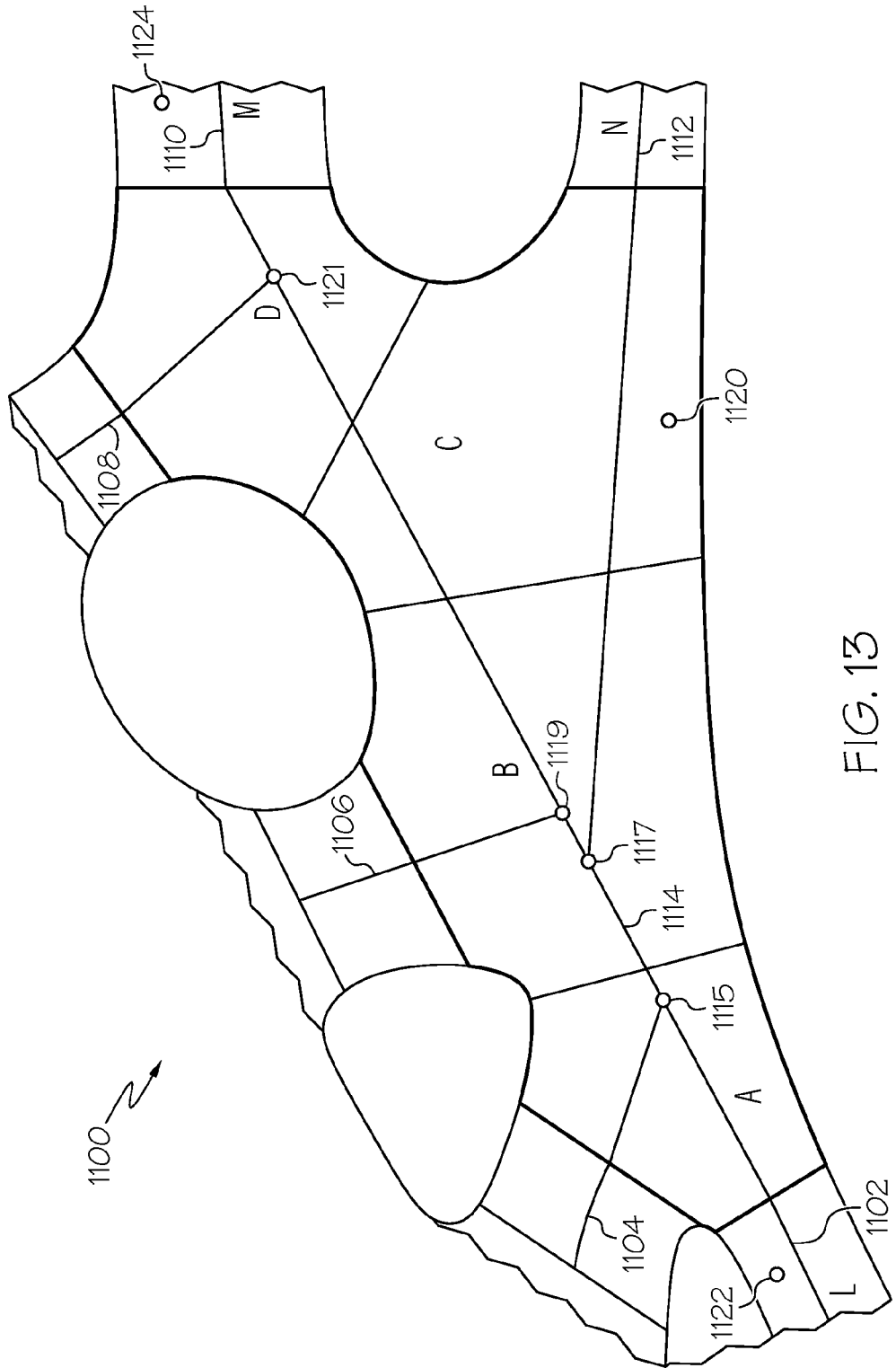
FIG. 13 is an illustration showing the generation of a centerline of an aggregate convergent polygon, according to an exemplary embodiment.

FIG. 13 is an illustration showing the generation of a centerline of an aggregate convergent polygon, according to an exemplary embodiment. Aerodrome surface features 1100 include aggregate convergent polygon 1120 made up of convergent polygon A, convergent polygon B, convergent polygon C and convergent polygon D (hereinafter, polygon A, polygon B, polygon C and polygon D are referred to as "child convergent polygons" to parent aggregate convergent polygon 1120). According to an exemplary embodiment, and similar to the discussion in FIG. 12, the adjacent polygons are shown with their associated centerlines, or links, generated.

Again, adjacency analysis and centerline comparison is performed in the terminal area network generator 40 and no centerlines are substantially parallel. Next, the terminal area network generator 40 determines distances between polygons and identifies a first adjacent polygon 1122 and a second adjacent polygon 1124 such that the first adjacent polygon 1122 and the second adjacent polygon 1124 are the most remote from each other (i.e., create the longest possible centerline for the aggregate convergent polygon 1120), and generates an aggregate convergent polygon centerline 1114 such that the aggregate convergent polygon centerline 1114 covers the maximum number of child convergent polygons.

Once aggregate convergent polygon centerline 1114 has been established, the centerlines of adjacent polygons are extended into the aggregate convergent polygon until they connect with the aggregate convergent polygon centerline 1114, forming a node. FIG. 13 depicts the extended centerlines and resultant nodes, for example: centerline 1104 extended to form noted 1115, centerline 1106 extended to form node 1119, centerline 1108 extended to form node 1121, and centerline 1112 extended to form node 1117.

Figure 14:
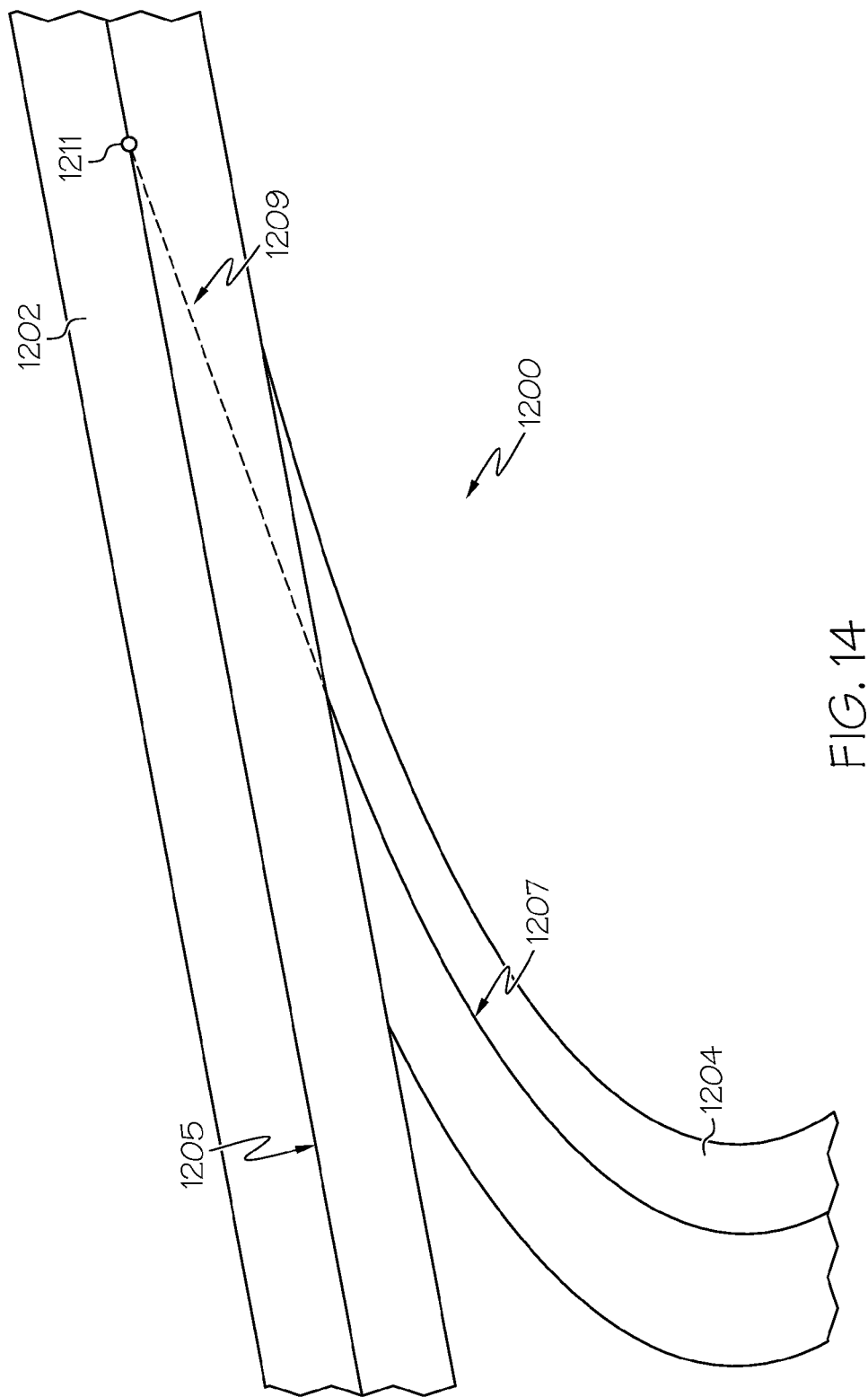
FIG. 14 is an illustration showing the extension of a centerline onto a runway according to an exemplary embodiment.

FIG. 14 is an illustration showing the extension of a centerline onto a runway according to an exemplary embodiment. Aerodrome surface features 1200 include runway 1202, having centerline 1205, determined as described hereinabove. Adjacent polygon 1204, having centerline 1207 is shown. The two centerlines, or links, are coupled by the simple extension of the centerline 1207 into the runway 1202 until the two centerlines connect, making a node 1211.

As described in FIGS. 1-14, the terminal area network generator 40 generates terminal area node-links, and then couples the terminal area node-links together. The result is the generation of a terminal area network, which is an aerodrome surface movement model that provides simplified representations of aerodrome surface movement. As such, the terminal area networks enable quick modeling of aerodrome surface movement and quick data transmission to aircraft.

Thus, there has been provided a method and system for a terminal area network generator that does not require manual processing steps. The terminal area network generator automatically constructs terminal area networks from terminal area node-links that do not require further manual processing. In the generation of the terminal area network, various available techniques may be utilized to reduce the number of nodes (node consolidation), for example, consolidating any two nodes separated by a distance parameter into one node. Additionally, various techniques may be utilized to smooth the links by eliminating some of the midpoints that are generated in the process of creating centerlines (vertex reduction techniques). Node consolidation and vertex reduction do not require manual processing. The exemplary embodiment is compatible with the AIRAC cycle.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for generation of a surface movement network, the method comprising the steps of:
  receiving, from an aerodrome mapping database, a travel path comprising a taxiway;
  receiving, from the aerodrome mapping database, a directionality of the travel path;
  representing the taxiway with a set of polygons;
  dividing each polygon in the set of polygons into a plurality of segments, each segment having a midpoint, wherein, for each polygon, the plurality of respective midpoints are substantially aligned with the directionality of the travel path;
  creating, for each polygon of the set of polygons, a centerline with substantially the same directionality as the travel path by connecting midpoints;
  generating a taxiway centerline using the polygon centerlines;
  receiving, from an aerodrome mapping database, a travel path comprising a runway;
  obtaining runway threshold points associated with the runway, wherein the runway threshold points are defined as centerline points on runway thresholds; and
  creating a runway centerline for the runway using the runway threshold points.

2. The method of claim 1, further comprising categorizing polygons according to the number of shared edges using intersections between travel paths.

3. The method of claim 2, wherein polygons having exactly two shared edges are connector polygons and wherein polygons having more than two shared edges are convergent polygons.

4. The method of claim 3, wherein, for a polygon with only one or two shared edges dividing the polygon into a plurality of segments comprises:
  obtaining a predetermined parameter from a memory device;
  dividing, consistent with directionality, a first unshared edge and a second unshared edge of the polygon at an equal number of equally spaced points using the predetermined parameter;
  generating a set of pairs of points by sequentially connecting a point on the first unshared edge to a point on the second unshared edge;
  determining, for each pair of points, a pair midpoint located in the middle of the pair of points;
  generating a centerline by connecting pair midpoints;
  for each shared edge, determining a shared edge midpoint; and
  connecting the centerline to a shared edge midpoint.

5. The method of claim 4, further comprising, for polygons with only one shared edge:
  generating a midpoint of a pseudo shared edge; and connecting the centerline to the midpoint of the pseudo shared edge.

6. The method of claim 5, further comprising:
  when a first convergent polygon is adjacent to a second convergent polygon, merging the first and second convergent polygons into an aggregate convergent polygon;
  repeating the merging until the aggregate convergent polygon is not adjacent to another convergent polygon.

7. The method of claim 6, further comprising, for aggregate convergent polygons:
  determining the distance between centerlines of pairs of polygons adjacent to the aggregate convergent polygon;
  determining a pair of adjacent polygons having a greatest distance between centerlines;
  creating an aggregate centerline of the aggregate convergent polygon by coupling the centerlines of the pair; and
  coupling centerlines from remaining adjacent polygons onto the aggregate centerline.

8. The method of claim 5, further comprising, for a first convergent polygon, adjacent to a first connector polygon and a second connector polygon, wherein a centerline of the first connector polygon and a centerline of the second connector polygon are substantially parallel:
  creating a convergent centerline coupling the centerline of the first connector polygon and the centerline of the second connector polygon; and
  coupling centerlines from remaining adjacent polygons to the convergent centerline.

9. The method of claim 3, further comprising, for a first convergent polygon, adjacent to two or more polygons for which none of the centerlines of the connector polygons are substantially parallel:

extracting the centroid of the first convergent polygon; and
coupling the centroid to the centerlines of the two or more polygons.

10. A system for generation of a surface movement network based on the Aerodrome Mapping Database, the system comprising:
a database configured to receive data from the Aerodrome Mapping Database; and
a processor coupled to the database;
the processor configured to (a) obtain a travel path comprising a taxiway, (b) obtain directionality of the travel path, (c) represent a taxiway by a set of polygons, (d) divide each polygon in the set of polygons into a plurality of segments, each segment having a respective midpoint, wherein, for each polygon, the plurality of respective midpoints are substantially aligned with the directionality of the travel path, (e) create, for each polygon of the set of polygons, a centerline with substantially the same directionality as the travel path of the taxiway polygons using directionality and (e) generate a taxiway centerline by connecting polygon centerlines, (f) receive, from an aerodrome mapping database, a travel path comprising a runway, (g) obtain runway threshold points associated with the runway, wherein the runway threshold points are defined as centerline points on runway thresholds, and (h) create a runway centerline for the runway using the runway threshold points.

11. The system of claim 10, wherein the processor is further configured to:
analyze locations of centerlines for pairs of adjacent travel paths; and
couple the centerlines consistent with directionality.

12. A method for generation of a surface movement network, the method comprising the steps of:
obtaining travel path data from an aerodrome mapping database;
sorting travel path data into runway or taxiway;
if travel path data comprises a runway, (i) obtaining, for the runway, centerline points the runway thresholds, and (ii) creating a runway centerline for the runway by coupling the centerline points on respective runway thresholds;
if travel path data comprises a taxiway, (i) representing the taxiway by a set of polygons; (ii) categorizing polygons according to the number of shared edges using intersections between travel paths, (iii) dividing each polygon in the set of polygons into a plurality of segments, each having a respective midpoint, wherein, for each polygon, the plurality of respective midpoints are substantially aligned with the directionality of the travel path, (iv) creating, for each polygon of the set of polygons, a centerline with substantially the same directionality as the travel path by connecting midpoints, and (v) generating a taxiway centerline using the polygon centerlines.

13. The method of claim 12, wherein polygons having exactly two shared edges are connector polygons and wherein polygons having more than two shared edges are convergent polygons.

14. The method of claim 13, wherein, for a polygon with only one or two shared edges dividing the polygon into a plurality of segments comprises:
obtaining a predetermined parameter from a memory device;
dividing, consistent with directionality, a first unshared edge and a second unshared edge of the polygon at an equal number of equally spaced points using the predetermined parameter;
generating a set of pairs of points by sequentially connecting a point on the first unshared edge to a point on the second unshared edge;
determining, for each pair of points, a pair midpoint located in the middle of the pair of points;
creating a polygon centerline by connecting neighboring pair midpoints;
determining midpoints of shared edges; and
connecting the centerline to the midpoints of the shared edges.

15. The method of claim 13, further comprising, for convergent polygons:
when a first convergent polygon is adjacent to a second convergent polygon, merging the first and second convergent polygons into an aggregate polygon; and
repeating the merging until the aggregate polygon is not adjacent to another convergent polygon.

16. The method of claim 15, further comprising, for aggregate convergent polygons:
determining the distance between centerlines of pairs of polygons adjacent to the aggregate convergent polygon;
determining a pair of adjacent polygons having a greatest distance between centerlines;
creating an aggregate centerline of the aggregate convergent polygon by coupling the centerlines of the pair; and
coupling centerlines from remaining adjacent polygons onto the aggregate centerline.

17. The method of claim 15, further comprising, for a first convergent polygon, adjacent to a first connector polygon and a second connector polygon, wherein a centerline of the first connector polygon and a centerline of the second connector polygon are substantially parallel:
creating a convergent centerline coupling the centerline of the first connector polygon and the centerline of the second connector polygon; and
coupling centerlines from remaining adjacent polygons to the convergent centerline.

18. The method of claim 15, further comprising, for a first convergent polygon, with two or more adjacent connector polygons for which no pairs of the two or more adjacent connector polygons have centerlines that are substantially parallel to each other:
extracting the centroid of the first convergent polygon; and
coupling the centroid to the centerlines of the two or more adjacent polygons.

\* \* \* \* \*